April 18, 1939.  W. C. BERRIEN  2,154,804
COMPUTING SCALE
Filed Jan. 29, 1936  2 Sheets-Sheet 1

INVENTOR.
WALTER C. BERRIEN
BY
ATTORNEY.

April 18, 1939.  W. C. BERRIEN  2,154,804
COMPUTING SCALE
Filed Jan. 29, 1936  2 Sheets-Sheet 2

INVENTOR.
WALTER C. BERRIEN
BY
ATTORNEY.

Patented Apr. 18, 1939

2,154,804

UNITED STATES PATENT OFFICE 2,154,804

COMPUTING SCALE

Walter C. Berrien, San Bruno, Calif.

Application January 29, 1936, Serial No. 61,358

1 Claim. (Cl. 265—37)

The present invention relates to weighing scales and pertains more particularly to that type of scale known as a computing scale, wherein upon weighing of an article of a known cost per pound the price of the article will automatically be registered.

It is the object of the present invention to provide an improved scale of the computing type having the usual weight indicating means, and also having means to indicate the cost per pound, and means to indicate the net cost of the quantity of said article weighed, the cost per pound indicating means being capable of ready adjustment for articles of different value, and all of said means being arranged to be readily visible by the purchaser as well as the seller.

It is a further object of the invention to provide a scale of this kind wherein the weighing mechanism is relatively simple in its construction though capable of accurate operation and wherein the weight, cost, and price indicating means are so constructed and correlated that their synchronous operation may be obtained through simple, durable and inexpensive mechanisms.

One form of my invention is exemplified in the accompanying drawings and described in greater detail in the following specification wherein further of its objects and advantages are made apparent.

Figure 1:
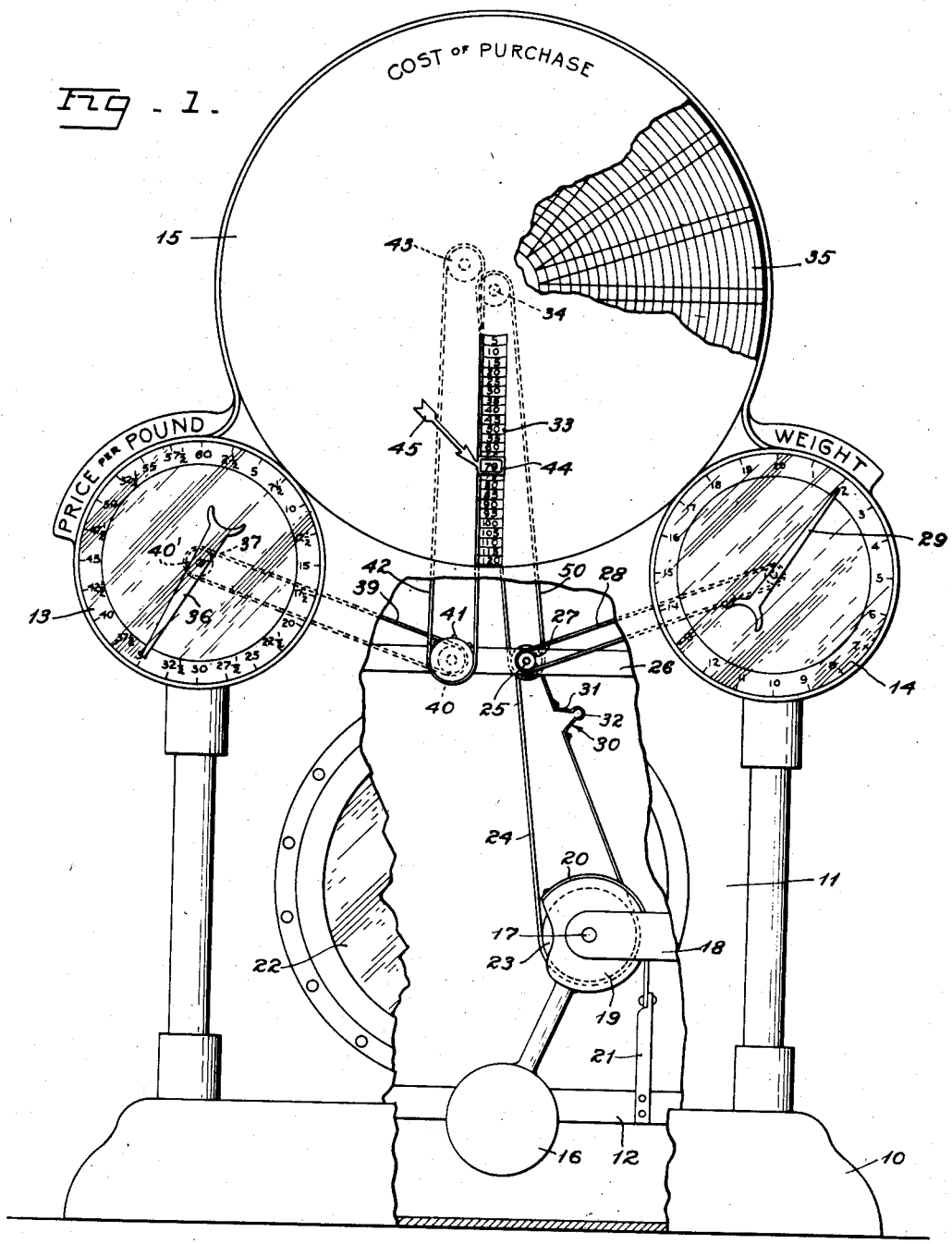
Fig. 1 is a front elevation of a computing scale constructed in accordance with my invention.

Referring in detail to the drawings the invention is shown as comprising a base 10 supporting an upstanding housing 11 and forming a receptacle for the usual floating weighing platform 12. The housing 11 in turn supports dials 13 and 14 upon which are registered respectively the price per pound and the actual weight of any article placed upon the platform 12. A centrally disposed and larger set of dials 15 also supported by the housing 11 is provided to register the exact cost of the article weighed, this cost being computed automatically as will hereinafter appear, from the reading of the price per pound and weight registering dials.

Figure 2:
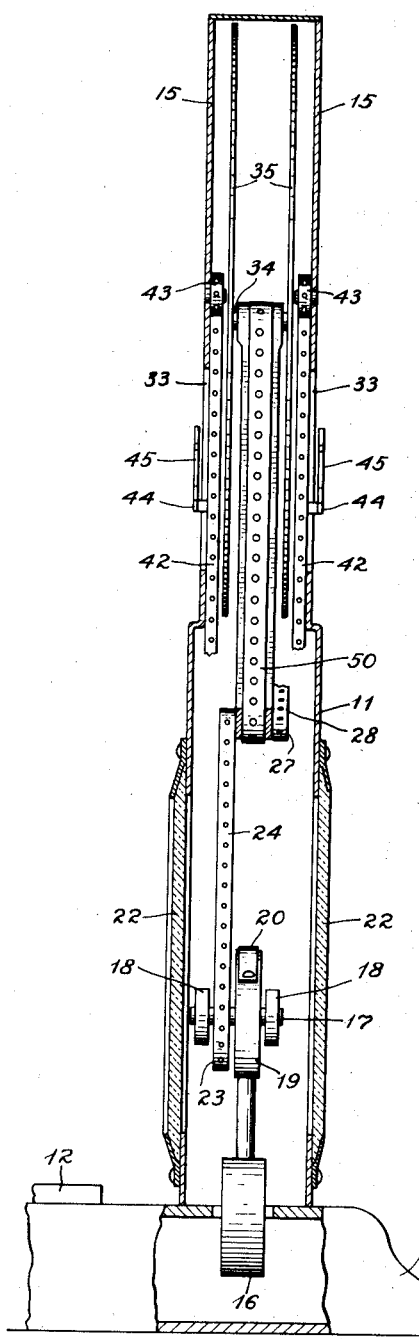
Fig. 2 is a vertical transverse section of the scale shown in Fig. 1.
Figure 3:
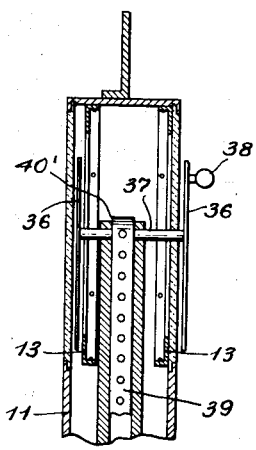
Fig. 3 is a fragmentary vertical transverse section taken through that portion of the scale referred to as the price per pound indicating means shown in Fig. 1.

All of the dials 13, 14 and plates 15 are provided in pairs, the members of each pair being faced oppositely and spaced apart a distance substantially the same as the walls of the housing 11 as appears in Figures 2 and 3 to provide space for their several operating mechanisms.

A pendulum 16 is suspended for swinging movement upon a shaft 17 journaled in spaced brackets 18 within the housing. The upper end of the pendulum is in the form of a segment 19 which is fixed relative to the pendulum and shaft 17 for oscillation therewith and which is connected by a flexible member such as a steel tape 20 with a stirrup 21 secured to the platform 12.

From the above description of the weighing mechanism it is apparent that an article placed upon the platform 12 will impart swinging movement to the pendulum and oscillation to its supporting shaft 17, the magnitude of this movement being directly proportional to the weight imposed upon the platform. It is desirable that the walls of the housing 11 be provided with windows 22 bringing this action of the weighing mechanisms into the view of observers and also making it possible for the purchaser standing before the scale to readily observe the action of the clerk in placing the article to be weighed upon the platform at the rear of the scale.

The oscillation of the pendulum supporting shaft 17, which is in degree proportional to the weight imposed upon the platform, is transmitted to the weight indicating dials 14 by the following means. A sprocket 23 fixed to the shaft 17 drives a flexible steel tape 24 perforated for driving engagement with the sprocket teeth and led over a sprocket fixed to a shaft 25 journaled in spaced cross bars 26 within the housing. Also fixed to the shaft 25 is a sprocket 27 which is connected by a similar perforated steel tape 28 with a sprocket disposed centrally of the weight indicating dials and fixed to a shaft the outer ends of which support pointers 29, one for each of the dials. The driving ratio of the sprockets is such that the hands 29 are caused to move over their respective dials at a rate to point to suitably spaced and numbered calibrations thereon to indicate accurately the weight imposed upon the platform 12.

Figure 4:
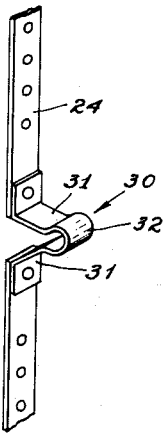
Fig. 4 is a perspective view, enlarged to illustrate details, of a tensioning means employed in connection with the perforated tape used to transmit motion between rotatable sprockets.

I have chosen perforated flexible metallic tape to transmit motion between the sprockets as I have found it to be more durable and more accurate than other mediums commonly used for this purpose. In order to compensate for any stretching or other irregularities in the length of these tapes that might possibly occur, the ends thereof may be connected by tension members, such as illustrated at 30 in Figs. 1 and 4. These members are shown as comprising spaced arms 31 secured to the ends of the perforated tape and joined by a curved portion 32. The curved portion 32 resiliently tends to contract and thereby places the tape under constant tension. While I have shown this type of tension member applied to but one of the tapes illustrated in Fig. 1, it is to be understood that its use may be desirable and is optional upon any or all of the tapes herein shown and described.

The cost of purchase plates 15 are illustrated as provided with elongated radially extending windows 33. Mounted at opposite ends of central shaft 34 (Fig. 2) are discs 35 having figures thereon visible through the windows 33. The figures on said discs are arranged in concentric circles and in radial columns. As the scale here illustrated is designed for weights from one to twenty pounds, there will be twenty such radial columns and consequently each concentric circle will comprise twenty figures ranging consecutively from the cost of one pound at a given price per pound to the cost of twenty pounds at the same price per pound. In the present drawings the figures are so arranged that the inner circle indicates the cost of an article valued at two and one-half cents per pound, the outer circle sixty cents per pound and the intermediate circles range between these values in increments of two and one-half cents. This is of course illustrative only and the arrangement of the figures may be varied to suit the particular requirements of the trade.

The discs 35 are moved about their axis a degree conforming to the movement of the hand 29 by means of a perforated tape 50 cooperating with suitable sprockets one of which is carried by the shaft 25 and the other by the shaft 34 which supports the discs.

Thus it appears that the weight of an article placed upon the platform is registered on the dials 14 and the cost of the article is brought into view through the radial window 33 of the plate 15. There remains only the necessity of determining from the known value per pound of the article being weighed, which of the displayed costs applies to it.

For the purpose of indicating the exact cost of purchase, the dials 13 are calibrated with various costs per pound corresponding to the costs represented by the concentric circles on the discs 35. Hands 36 movable over the faces of the dials 13 are supported on the opposite ends of a shaft 37 (Fig. 3) and one of these hands, preferably that facing the clerk, is disposed exteriorly of the glass dial cover and may be provided with means such as an ear 38 so that the hands may be rotated to indicate any desired value represented on the faces of the dials.

Figure 5:
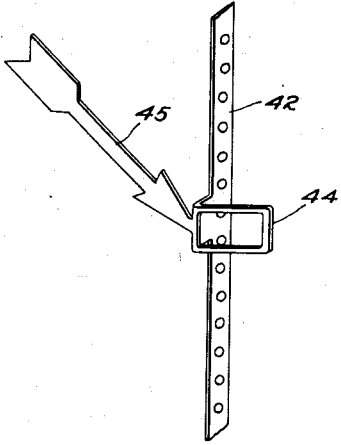
Fig. 5 is an enlarged perspective view of a portion of the mechanism employed in connection with the cost of purchase indicating means.

The shaft 37 is connected by a suitable sprocket 40' and perforated tape 39 with a sprocket 40 on a shaft which also drives a pair of sprockets 41. A pair of tapes 42 are driven by the sprockets 41 and are led over idler sprockets 43 (Figs. 1 and 2). The tapes 42 carry any suitable form of indicators such for example as the small frame 44 and arrow 45, as shown in detail in Fig. 5, to designate on the discs 35 the particular figure displayed through the window 33 that is the component of the price per pound selected on dial 13 and the weight indicated on the dial 14. Thus, and as shown in the drawings, an article weighing two pounds and having a value of thirty-five cents per pound set upon the dial 13 will have its cost automatically computed and accurately indicated upon the discs 35 through the slots 33 in plates 15 and the window 44.

A scale such as that above described effects a great saving in time and obviates the possibility of many errors which occur in mentally computing the cost of purchases. It is merely necessary for a clerk filling an order to set the hands 36 at the position representing the price per pound of the article being weighed. The weight of the article placed upon the platform is registered upon the dials 14, the proper columns of figures on the discs 35 are brought into registry with the windows 33 and the frames 44 by reason of their position select the cost of the article. The arrows 45 of course assist locating the proper number with the eye. All of these results are visible both to the clerk and the purchaser even though they view the scale from opposite sides.

While I have illustrated and described my invention more or less specifically, it is to be understood that variations in the arrangement and construction of its several parts may be resorted to within its scope as defined by the appended claim.

Having thus described this invention, what I claim and desire to secure by Letters Patent is:

In a computing scale having weight indicating means, price indicating means, and cost of purchase indicating means, said cost of purchase indicating means having radially and concentrically arranged cost figures thereon, and said weight indicating means and cost of purchase indicating means being operatively connected by endless belts to each other and to a common actuating member; an indicator movably mounted in relation to the radial and concentric figures on the cost of purchase means; and means of connection between said indicator and the price indicating means.

WALTER C. BERRIEN.